(12) United States Patent
Meyers

(10) Patent No.: US 9,951,817 B2
(45) Date of Patent: Apr. 24, 2018

(54) INTEGRAL OIL DAMPER AND JET FOR LUBRICATION OF BEARINGS AND SEALS

(71) Applicant: United Technologies Corporation, Hartford, CT (US)

(72) Inventor: Gregory Meyers, West Hartford, CT (US)

(73) Assignee: United Technologies Corporation, Hartford, CT (US)

( * ) Notice: Subject to any disclaimer, the term of this patent is extended or adjusted under 35 U.S.C. 154(b) by 77 days.

(21) Appl. No.: 14/944,682

(22) Filed: Nov. 18, 2015

(65) Prior Publication Data

US 2016/0160924 A1 Jun. 9, 2016

Related U.S. Application Data

(60) Provisional application No. 62/087,544, filed on Dec. 4, 2014.

(51) Int. Cl.
*F16C 33/66* (2006.01)
*F01D 25/16* (2006.01)
(Continued)

(52) U.S. Cl.
CPC ........ *F16C 33/6659* (2013.01); *F01D 25/164* (2013.01); *F01D 25/18* (2013.01);
(Continued)

(58) Field of Classification Search
CPC .. F16C 33/66; F16C 33/6637; F16C 33/6659; F16C 33/6666; F16C 33/6674;
(Continued)

(56) References Cited

U.S. PATENT DOCUMENTS 2,747,945 A * 5/1956 Fulton ................ F16C 33/3862
384/467
3,158,413 A 11/1964 Shelley
(Continued)

FOREIGN PATENT DOCUMENTS

DE 102012211891 A1 1/2014
GB 1258294 A 12/1971
(Continued)

OTHER PUBLICATIONS

Extended European Search Report for EP Application No. 15197788.1, dated Aug. 24, 2016, 7 Pages.

*Primary Examiner* — Alan B Waits
(74) *Attorney, Agent, or Firm* — Kinney & Lange, P. A.

(57) ABSTRACT

A system for utilizing a pressurized fluid includes first, second, and third coaxially disposed body members, each having a cylindrical shape. The third body member is movable relative to the second body member. The second body member has walls that define a cavity between the first and second body members and a passage within the second body member that directs pressurized fluid from a cavity to the third body member. A method of utilizing a pressurized fluid includes providing a coupling and a housing having a cavity defined therebetween, supplying pressurized fluid to the cavity, and providing a first passage that extends from the cavity to a first axially-facing surface of the non-rotating component. The cross-sectional area defined perpendicular to a local flow direction is configured for choked flow within the first passage.

11 Claims, 5 Drawing Sheets

(51) Int. Cl.
  *F16C 19/26* (2006.01)
  *F01D 25/18* (2006.01)
  *F16C 27/04* (2006.01)
  *F16C 33/76* (2006.01)

(52) U.S. Cl.
  CPC ............ *F16C 27/045* (2013.01); *F16C 19/26* (2013.01); *F16C 33/6677* (2013.01); *F16C 33/76* (2013.01)

(58) Field of Classification Search
  CPC .... F16C 33/6681; F16C 27/045; F16C 19/26; F01D 25/165; F01D 25/18
  See application file for complete search history.

(56) References Cited

U.S. PATENT DOCUMENTS

| | | | |
|---|---|---|---|
| 3,456,992 A * | 7/1969 | Kulina | ............... F16C 27/045 384/100 |
| 3,640,590 A | 2/1972 | Beisemann | |
| 3,652,139 A | 3/1972 | Memery | |
| 3,836,215 A * | 9/1974 | Dopkin | ............... F16C 27/045 384/99 |
| 3,863,995 A | 2/1975 | Jones | |
| 3,877,732 A | 4/1975 | Mohaupt | |
| 3,915,521 A | 10/1975 | Young | |
| 4,006,944 A | 2/1977 | Ando et al. | |
| 4,334,720 A * | 6/1982 | Signer | ............... F16C 33/60 384/475 |
| 4,337,983 A | 7/1982 | Hibner | |
| 4,451,200 A | 5/1984 | Libertini et al. | |
| 4,527,912 A * | 7/1985 | Klusman | ............... F01D 25/164 384/99 |
| 4,676,667 A * | 6/1987 | Komatsu | ............... F01D 25/16 384/517 |
| 4,721,441 A | 1/1988 | Miyashita et al. | |
| 4,838,028 A | 6/1989 | Witt | |
| 4,992,024 A | 2/1991 | Heydrich | |
| 5,048,978 A | 9/1991 | Singh | |
| 5,071,262 A | 12/1991 | Monzel et al. | |
| 5,207,511 A | 5/1993 | Bobo | |
| 5,749,660 A * | 5/1998 | Dusserre-Telmon | . F16C 19/166 384/475 |
| 5,807,010 A | 9/1998 | Parker et al. | |
| 5,807,070 A * | 9/1998 | Bock | ............... F04D 29/051 29/407.01 |
| 6,325,546 B1 * | 12/2001 | Storace | ............... F01D 21/04 384/536 |
| 6,607,157 B1 | 8/2003 | Duescher | |
| 7,707,983 B2 * | 5/2010 | Ueno | ............... F01L 1/047 123/90.31 |
| 8,668,155 B2 | 3/2014 | Wright | |
| 9,033,581 B2 * | 5/2015 | Carter | ............... F16C 33/6677 384/475 |

FOREIGN PATENT DOCUMENTS

| | | |
|---|---|---|
| GB | 1417825 A | 12/1975 |
| JP | S55107114 A | 8/1980 |

* cited by examiner

INTEGRAL OIL DAMPER AND JET FOR LUBRICATION OF BEARINGS AND SEALS

CROSS-REFERENCE TO RELATED APPLICATION

This application claims the benefit of U.S. Provisional Application No. 62/087,544, filed Dec. 4, 2014 for "INTEGRAL OIL DAMPER AND JET FOR LUBRICATION OF BEARINGS AND SEALS".

BACKGROUND

This invention relates generally to fluid systems for lubricating and cooling components and, more particularly, to utilizing pressurized fluids within such systems.

In the context of mechanical assemblies, in particular rotatable assemblies, fluid systems often include cavities containing pressurized fluid. Seals or, in other cases, tightly-controlled gaps or interference fits, retain a substantial amount of pressurized fluid. Some of the pressurized fluid escapes, leaking through the seals or gaps. Mechanical vibrations can exasperate the fluid leakage by causing perturbations of the mechanical assembly components that periodically increase the pressure of the fluid within the cavity and/or increase or introduce a seal gap. To counteract fluid leakage, additional fluid is supplied to the mechanical assembly, increasing the size, weight, and complexity attributed to scavengability of the system. Moreover, in lightweight or space limited applications, integrating fluid systems within mechanical assemblies drives smaller component sizes while increased fluid supply necessitates additional and/or larger components to manage the pressurized fluid.

Therefore, a need exists to minimize the leakage from fluid systems utilized in mechanical assemblies in a manner in which the functions of individual components can be combined, enabling the fluid system to be integrated into smaller, light-weight mechanical assemblies.

SUMMARY

A system for utilizing a pressurized fluid includes a first body member, a second body member, a third body member, and at least one seal disposed between the first and second body members. The second body member has walls that define a cavity between the first and second body members and a passage within the second body member that extends from the cavity to a plenum. The at least one seal is configured to retain a pressurized fluid within the cavity. The third body member is moveable relative to the second body member. The first, second, and third body members are coaxially disposed, each having a cylindrical shape.

A system includes a coupling and a housing wherein the coupling includes a rotating component and a non-rotating component that are coaxially disposed. The non-rotating component defines a passage therein and, in cooperation with the housing, defines a cavity therebetween. The passage extends from the cavity to an axially-facing surface of the non-rotating component.

A method of utilizing a pressurized fluid includes providing a coupling and a housing having a cavity defined therebetween, supplying pressurized fluid to the cavity, and providing a first passage that extends from the cavity to a first axially-facing surface of the non-rotating component. The cross-sectional area defined perpendicular to a local flow direction is configured for choked flow within the first passage.

DETAILED DESCRIPTION

Figure 1A:
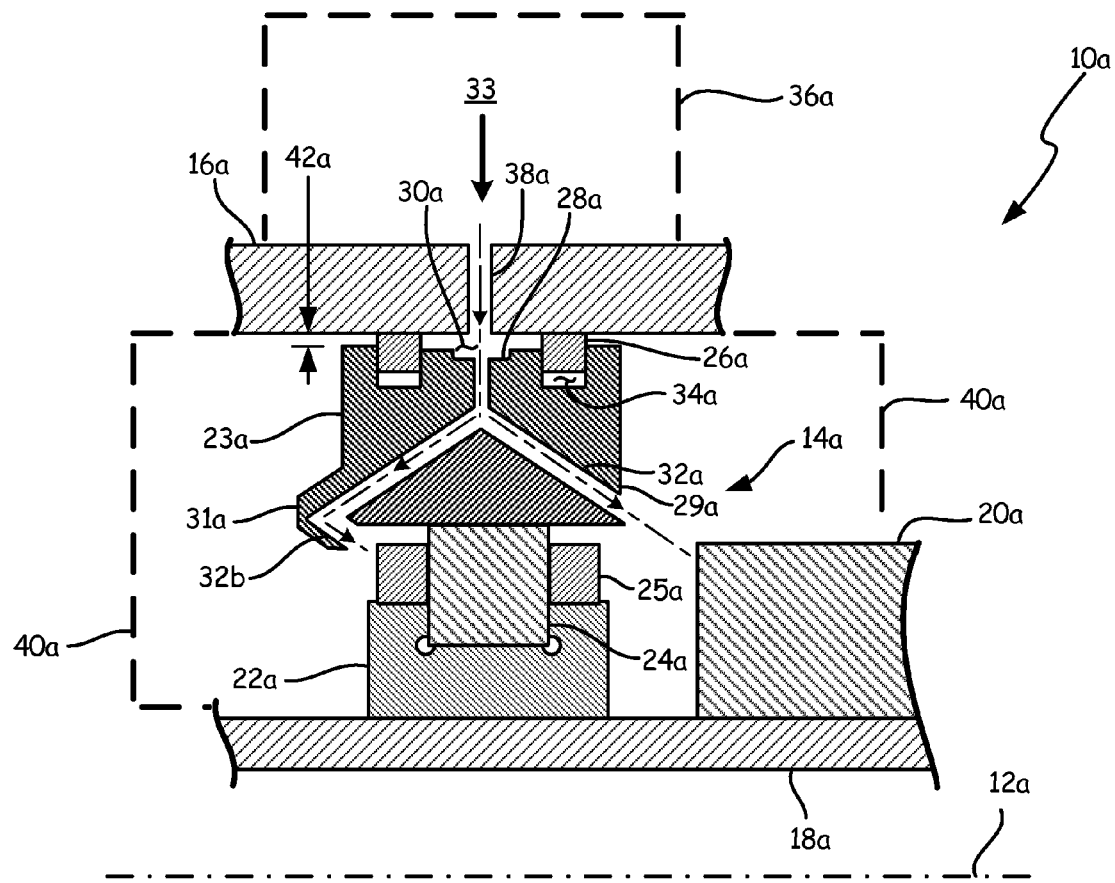
FIG. 1A is a cross-sectional view of a mechanical assembly that includes a bearing having a cavity and passages within a radially outward non-rotating component for utilizing a pressurized fluid.

FIG. 1A is a cross-sectional view of mechanical assembly 10a taken along a radial plane that intersects axis 12a. Axis 12a defines an axial direction parallel to axis 12a, a radial direction perpendicular to axis 12a, and an angular direction (rotational direction) about axis 12a. Mechanical assembly 10a includes bearing 14a radially disposed between housing 16a and shaft 18a and proximate to adjacent component 20a. Bearing 14a includes rotating component 22a, non-rotating component 23a, rolling elements 24a, carrier 25a, and at least one seal 26a, which are coaxially-disposed with respect to axis 12a. Generally, bearing 14a radially restrains shaft 18a with respect to housing 16a. Bearing 14a is constructed from metallic and/or ceramic materials, the specific selection of materials depends on the operating conditions of mechanical assembly 10a and can be selected using conventional methods.

Rotating component 22a is affixed to shaft 18a using conventional methods that can include an interference fit, retention nut (not shown), or other mechanical attachment method. Shaft 18a and component 22a rotate about axis 12a, creating relative rotational movement between rotating component 22a and non-rotating component 23a at rolling elements 24a. Rotating component 22a has a generally cylindrical shape and, in some embodiments, is the outer race of a rolling element bearing.

Non-rotating component 23a includes recess 28a that cooperates with an opposing surface of housing 16a to form cavity 30a. Recess 28a can be a depression, groove, pocket, or other mechanical discontinuity formed in non-rotating component 23a. In this embodiment, recess 28a is a circumferentially-extending groove formed in a radially outward surface of non-rotating component 23a. Non-rotating component 23a further includes one or more passages 32a and 32b that are formed internally therein. Passages 32a and 32b can extend from cavity 30a to an opposing surface of non-rotating component 23a. In some embodiments, passage 32a extends from cavity 30a to axial face 29a of non-rotating component 23a, the centerline of passage 32a intersecting a surface of adjacent component 20a. In other embodiments, passage 32b can extend from cavity 30a to rolling elements 24a. In these embodiments, non-rotating component 23a can have axially-extending protrusion (or separate mechanically attached feature) 31a for redirecting passage 32b such that the centerline of passage 32b at its outlet intersects rolling elements 24a and/or carrier 25a. In a typical arrangement for any embodiment, passages 32a and 32b have centerlines that are contained within a radial plane extending through axis 12a. However, it is not necessary for passages 32a and 32b to be only radially-oriented. For example, passage 32a and/or 32b can also extend at an angle with respect to the radial plane such that passage 32a and/or 32b extends out of plane. Moreover, one or more configurations of passages 32a and/or 32b described above can be used individually or simultaneously depending on the fluid requirements of mechanical assembly 10a.

Rolling elements 24a are disposed between rotating component 22a and non-rotating component 23a and have a cylindrical or spherical shape orientated to facilitate relative rotation of component 22a with respect to component 23a about axis 12a. For example, cylindrical rolling elements have an axis of rotation parallel with axis 12a. Carrier 25a restrains each rolling element 24a relative to every other rolling element 24a.

Bearing 14a can further include at least one seal 26a disposed between housing 16a and non-rotating component 23a. Seal 26a has a shape that conforms to the opposing surfaces of housing 16a and non-rotating component 23a and is configured to retain pressurized fluid 33 within cavity 30a. In the embodiment depicted in FIG. 1A, there are two seals 26a that have an annular or ring shape, sometimes referred to as piston seals. Each seal 26a is axially-restrained within seal grooves 34a and disposed such that a small gap exists between each seal 26a and the non-rotating component 23a as shown in FIG. 1A. Opposing surfaces between seal 26a and housing 16a form a tightly-controlled or interference fit to facilitate containment of pressurized fluid 33 within cavity 30a.

Mechanical assembly 10a can further include pressurized fluid 33 and the components associated with its supply and return. Typically, pressurized fluid 33 is oil having lubricating and cooling properties selected for the operating conditions of mechanical assembly 10a, although other fluids can be used. Initially, pressurized fluid 33 resides in sump 36a and is supplied to cavity 30a through inlet 38a, which extends through a portion of housing 16a. The pressure of fluid 33 is selected using conventional methods. The flow rate of pressurized fluid 33 supplied to cavity 30a is sufficient to maintain the pressure of fluid 33 within cavity 30a and to provide desired flow rates through one or more passages 32a and 32b. In some embodiments, pressurized fluid 33 discharges from passages 32a and 32b as a high-velocity jet suitable for impingement cooling. After exiting passages 32a and 32b, pressurized fluid 33 is collected in plenum 40a. Then, pressurized fluid 33 is scavenged or returned to sump 36a using scrapers, scoops, or other conventional methods.

Optionally, bearing 14c includes gap 42a formed between opposing surfaces of housing 16a and non-rotating component 23a. In some embodiments, gap 42a can form a tightly-controlled or interference fit. In this case, gap 42a functions to locate and retain bearing 14a with respect to housing 16a. In other embodiments, gap 42a can be sized such that pressurized fluid 33 forms a fluid damper between coupling 14a and housing 16a. In this case, gap 42a is sized in light of the properties of pressurized fluid 33 to provide a fluidic spring between coupling 14a and housing 16a such that the magnitude of mechanical vibrations transmitted through bearing 14a from shaft 18a to housing 16a are reduced.

In prior art bearings, mechanical vibrations or displacements increase leakage of pressurized fluid 33 from cavity 30a by momentarily increasing the pressure of fluid 33 within cavity 30a and/or by causing periodic mechanical perturbations of non-rotating component 23a and seal 26a with respect to housing 14a. Because the leakage rate of seal 26a is generally proportional to the differential pressure retained by seal 26a, increased pressure of fluid 33 can momentarily increase leakage between seal 26a and housing 16a or between seal 26a and non-rotating component 23a. Likewise periodic mechanical perturbations can momentarily decrease the sealing capacity of seal 26a, causing similar leakage. Pressurized fluid 33 that escapes cavity 30a in this manner is collected by plenum 40a, bypassing the bearing 14a. Consequently, mechanical assembly 10a requires a quantity of pressurized fluid 33 to account for the requirements of bearing 14a and the leakage from cavity 30a.

In the present invention, one or more passages 32a and 32b provide an alternate path for pressurized fluid 33 when mechanical assembly 10a experiences mechanical vibrations or displacements. Instead of leaking across the interfaces between seal 26a and housing 16a or between seal 26a and non-rotating component 23a, some of the previously leaked pressurized fluid 33 flows through passages 32a and 32b. Moreover, because passages 32a and/or 32b provide alternate routes for pressurized fluid 33, the magnitude of the pressure increase within cavity 30a is less than a similar bearing without passages 32a and/or 32b. Therefore, bearing 14a has less leakage than a similar bearing without passages 32a and/or 32b, allowing mechanical assembly 10a to function with a smaller quantity of fluid 33. Moreover, the supply of fluid 33 is integrated into bearing 14a instead of utilizing separate fluid supply components (e.g. oil transfer rings and/or oil deflectors) normally contained within prior art mechanical assemblies, further reducing the size and weight of mechanical assembly 10a.

Figure 1B:
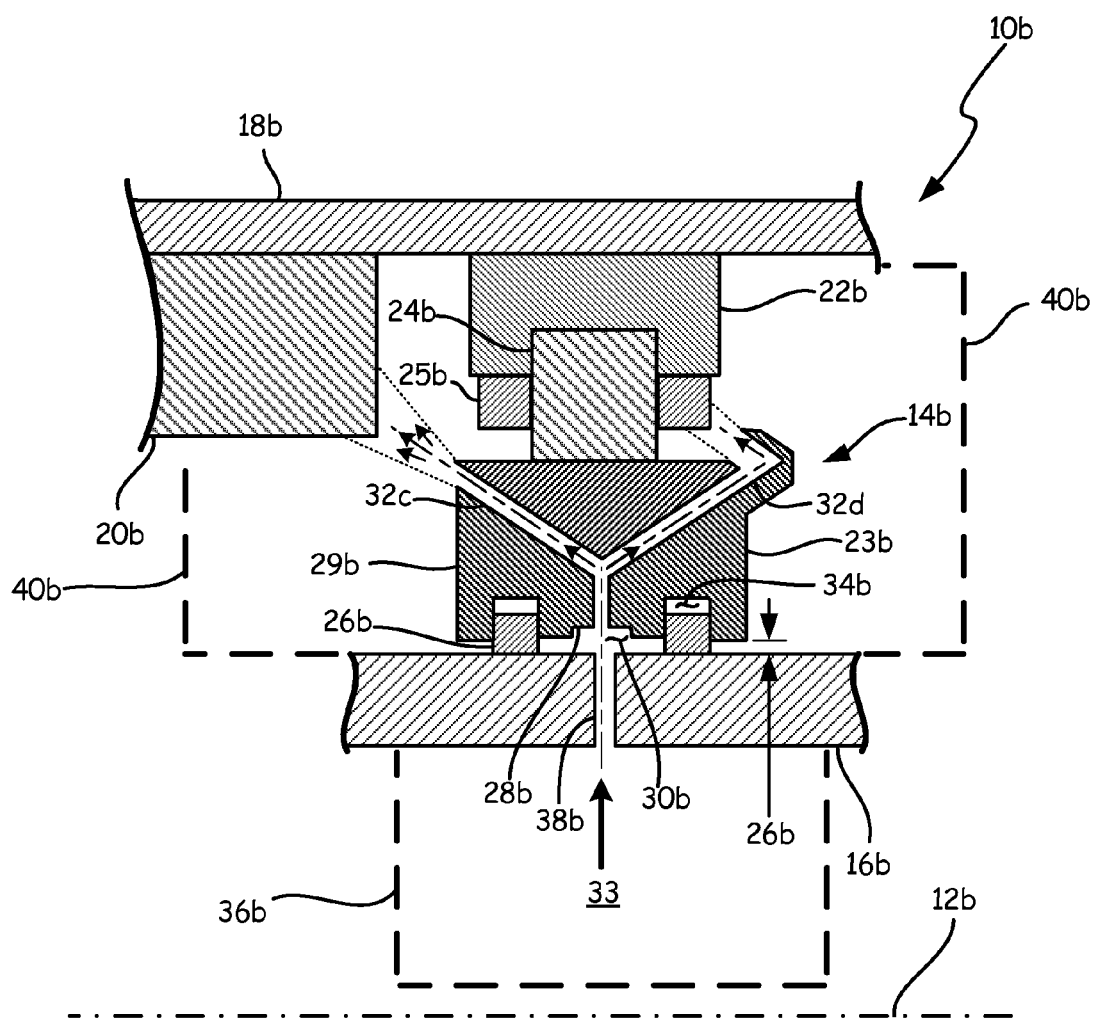
FIG. 1B is a cross-sectional view of a mechanical assembly that includes a bearing having a cavity and passages within a radially inward non-rotating component for utilizing a pressurized fluid.

FIG. 1B is a cross-sectional view of mechanical assembly 10b taken along a radial plane that intersects axis 12b which defines axial, radial, and angular directions analogous to axis 12a. Mechanical assembly 10b is substantially similar to mechanical assembly 10a in which similar reference numbers refer to like components between assemblies 10a and 10b. For example, passages 32c and 32d are substantially similar to passages 32a and 32b, respectively. The principle difference between mechanical assemblies 10a and 10b is the relative arrangement of the rotating components (18b, 20b, 22b, 24b, and 25b) and non-rotating components (16b, 23b, and 26b). In mechanical assembly 10b, housing 16b, non-rotating component 23b, and seals 26b are disposed radially inward from rotating components (18b, 20b, 22b, 24b, and 25b).

Figure 2:
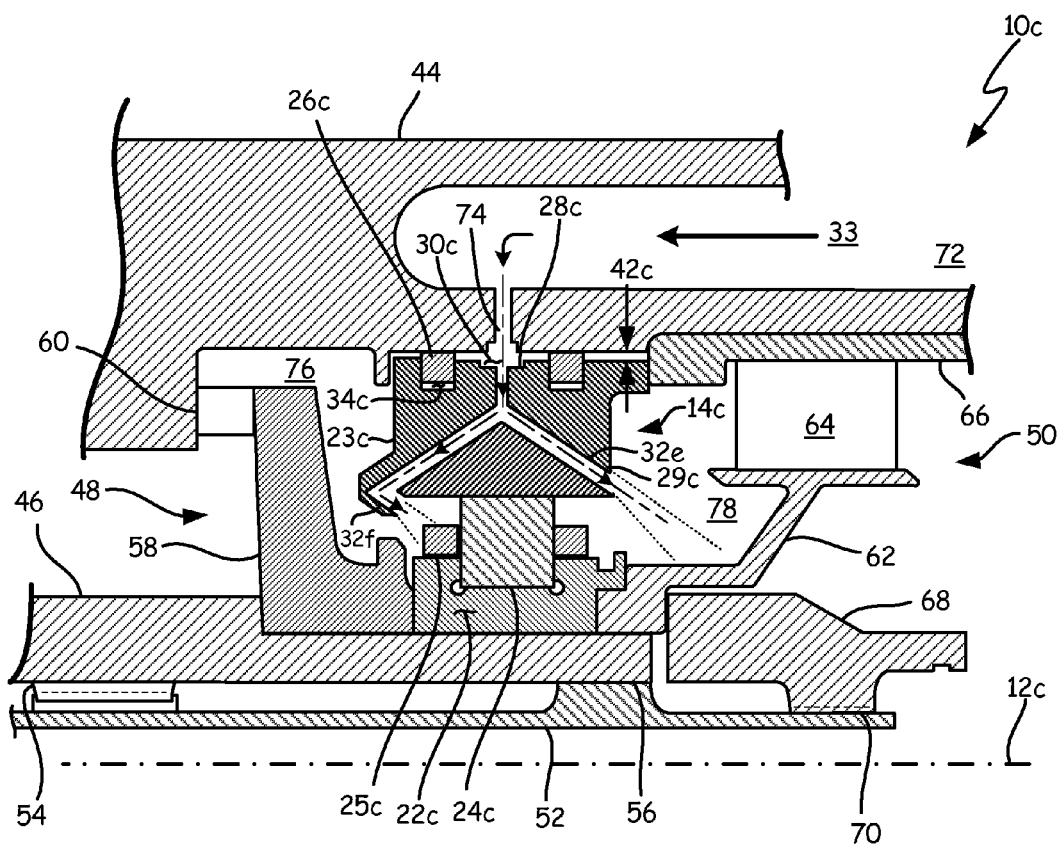
FIG. 2 is a cross-sectional view of a mechanical assembly that includes a fluidly-damped bearing having a cavity and passages for utilizing a pressurized fluid.

FIG. 2 is a cross-sectional view of mechanical assembly 10c taken along a radial plane that intersects axis 12c which defines axial, radial, and angular directions analogous to axis 12a. Mechanical assembly 10c further describes one embodiment of bearing 14c. Bearing 14c is substantially similar to bearing 14a in which similar reference numbers indicate like components. For example, passages 32e and 32f are substantially similar to passages 32a and 32b.

In this embodiment, bearing 14c is radially disposed between housing 44 and bearing sleeve 46 and axially disposed between face seal 48 and shaft seal 50. Bearing sleeve 46 interfaces with shaft 52 at spline teeth 54 and interference fit 56, each axially displaced from bearing 14c. At its radially outer face, non-rotating component 23c forms gap 42c with housing 44. Seals 26c retain pressurized fluid 33 within cavity 30c such that a fluid damper exists between non-rotating component 23c and housing 44. Face seal 48 includes seal runner 58 and seal element 60. Seal 48 assembles onto bearing sleeve 46, axially restrained by a portion thereof. Bearing 14c abuts face seal 48 and shaft seal 50, which includes seal runner 62, seal element 64, and seal housing 66. Face seal 48, bearing 14c, and shaft seal 50 are axially retained by nut 68, nut 68 being affixed to shaft 52 by threaded portion 70.

Functioning similarly to mechanical assemblies 10a and 10b, mechanical assembly 10c has pressurized fluid 33 that initially resides in sump 72 formed by interior walls within housing 44. Pressurized fluid 33 flows through radially-extending inlet 74 to cavity 30c where it is contained by seals 26c that function in a substantially similar manner to seals 26a. First passage 32e extends from cavity 30c to axial face 29c of non-rotating component 23c such that a centerline extending therethrough intersects a surface of seal runner 62 for directing pressurized fluid 33 thereto. Second passage 32f extends from cavity 30c to rolling elements 24c via protrusion 31c that extends axially from an opposing axial face of non-rotating component 23c. A centerline of an outlet portion of second passage 32f intersects rolling elements 24c and carrier 25c for directing pressurized fluid 33 thereto. The flow rate of pressurized fluid 33 supplied to cavity 30c is sufficient to maintain the pressure of fluid 33 within cavity 30c while supplying desired flow rates to passages 32e and 32f. After exiting first and second passages 32e and 32f, pressurized fluid 33 is collected in plenum 76 and plenum 78 which are sealed by face seal 48 and shaft seal 50, respectively. Plenum 76 is defined by cooperating walls among face seal 48, bearing 14c, and housing 44 and, plenum 78 is defined by cooperating walls among bearing 14c and shaft seal 50. Fluid 33 collected in plenums 76 and 78 returns to sump 72 via conventional methods (not shown) such as scrapers, scoops, and other mechanical methods.

First and second passages 32e and 32f have centerlines contained within a radial plane that intersects axis 12c. Optionally, pairs of first and second passages 32e and 32f can be angularly spaced around bearing 14c. First and second passages 32e and 32f have cross-sectional areas defined perpendicularly with respect to a local flow direction within each passage. The cross-sectional areas are selected to establish: 1) a desired first flow rate through first passage 32e, 2) a desired second flow rate through second passage 32f that can be equal to the first flow rate, 3) an average pressure of fluid 33 within cavity 30c sufficient to radially restrain bearing 14c while reducing mechanical vibrations transmitted through bearing 14c from rotating component 22c to non-rotating component 23c, and 4) choked flow within each passage 32e and 32f.

Figure 3A:
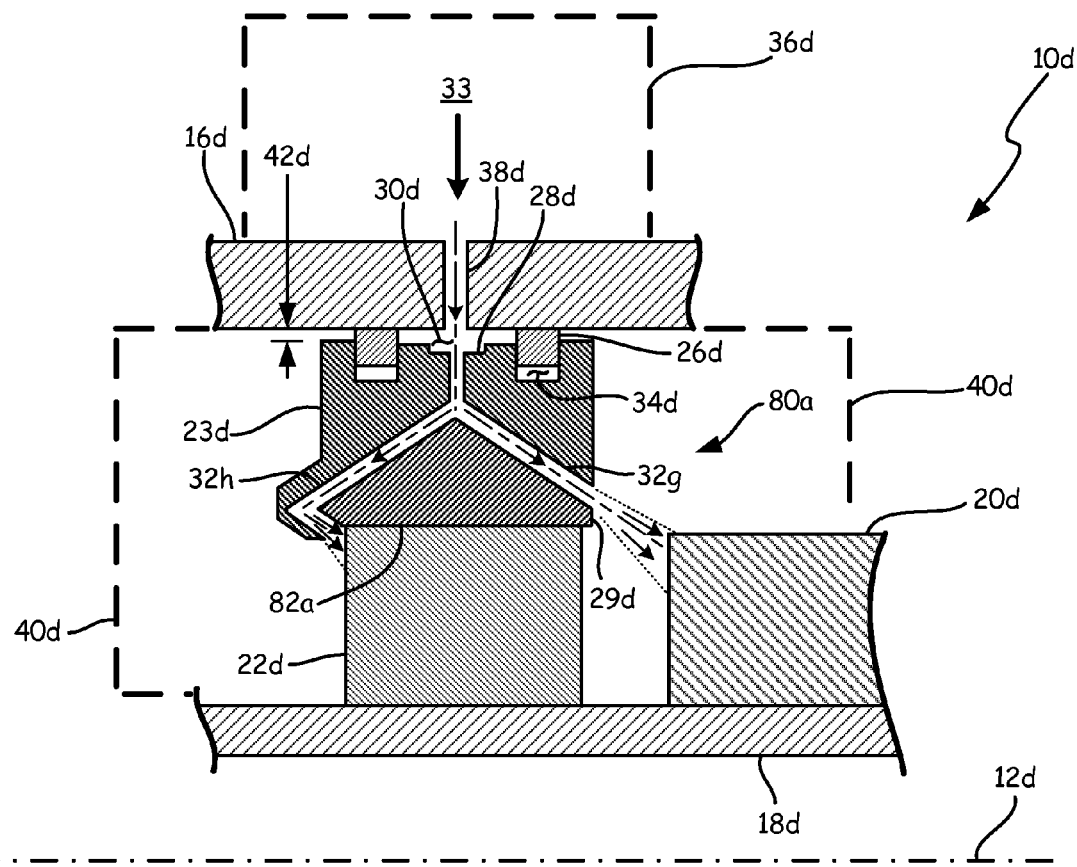
FIG. 3A is a cross-sectional view of a mechanical assembly that includes a coupling having a cavity and passages within a radially outward non-rotating component for utilizing a pressurized fluid.
Figure 3B:
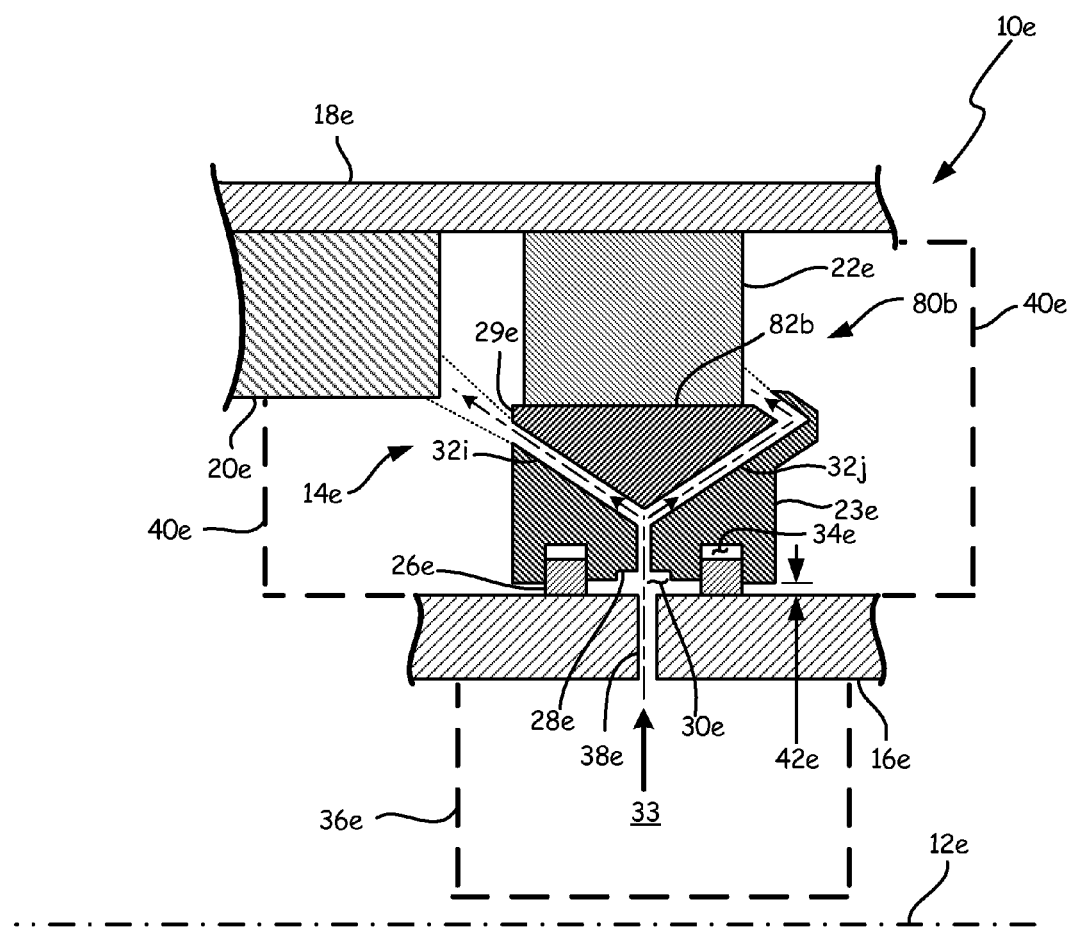
FIG. 3B is a cross-sectional view of a mechanical assembly that includes a coupling having a cavity and passages within a radially inward non-rotating component for utilizing a pressurized fluid.

Although FIGS. 1A, 1B, and 2 describe the present invention in reference to bearings 14a-c, one skilled in the art will appreciate that the present invention is equally applicable to other mechanical couplings between a rotating and stationary components. For example, FIGS. 3A and 3B are cross-sectional views of couplings 80a and 80b taken along axes 12d and 12e, respectively. Instead of bearings, couplings 80a and 80b each have rotating components 22d-e and non-rotating components 23d-e, creating relative rotational movement at sliding interfaces 82a and 82b, respectively. Passages 32g-j, and other components having similarly described reference numerals, function in a manner previously described.

Discussion of Possible Embodiments

The following are non-exclusive descriptions of possible embodiments of the present invention.

A system for utilizing a pressurized fluid includes a first body member, a second body member, a third body member, and at least one seal disposed between the first and second body members. The second body member has walls that define a cavity between the first and second body members and a first passage within the second body member that directs pressurized fluid from the cavity to the third body member. The third body member is moveable relative to the second body member. The first, second, and third body members are coaxially disposed, each having a cylindrical shape.

The system of the preceding paragraph can optionally include, additionally and/or alternatively, any one or more of the following features, configurations and/or additional components:

A further embodiment of the foregoing system, wherein a surface of the first body member can be spaced from an opposing surface of the second body member so as to define an annular gap in fluid communication with the cavity.

A further embodiment of any of the foregoing systems can further include at least one seal disposed between the first and second body members and configured to retain the pressurized fluid within the cavity.

A further embodiment of any of the foregoing systems, wherein the passage can have a cross-sectional area defined perpendicular to a local flow direction of the pressurized fluid configured for choked flow within the passage.

A further embodiment of any of the foregoing systems, wherein the walls of the second body member can define a second passage extending from the cavity to a plenum thereby directing the pressurized fluid from the cavity to an adjacent component.

A further embodiment of any of the foregoing systems can further include a plurality of rolling elements disposed between the second and third body elements such that the third element is rotatable with respect to the second body element, wherein the passage can direct pressurized fluid from the cavity to at least one of the rolling elements.

A further embodiment of any of the foregoing systems, wherein a surface of the first body member can be spaced from an opposing surface of the second body member so as to define an annular gap cooperating with the cavity, and wherein the walls of the second body member can define a plurality of passages angularly spaced within the second body member that extend from the cavity to the plenum, and wherein each passage can have a cross-sectional area perpendicular to a local flow direction configured for a choked flow condition within each passage.

A system includes a coupling and a housing. The coupling includes a rotating component and a non-rotating component coaxially disposed with respect to the rotating component having a first passage defined therein. The housing is affixed with respect to the non-rotating component, wherein the housing and the non-rotating component have walls that define a cavity therebetween, and wherein the first passage extends from the cavity to an axially-facing surface of the non-rotating component.

The system of the preceding paragraph can optionally include, additionally and/or alternatively, any one or more of the following features, configurations and/or additional components:

A further embodiment of the foregoing system, wherein a surface of the housing can be spaced from an opposing surface of the non-rotating component to define an annular gap in fluid communication with the cavity, and wherein the cavity can contain a fluid having a pressure sufficient to radially restrain the coupling with respect to the housing.

A further embodiment of any of the foregoing systems, wherein the first passage can have a cross-sectional area defined perpendicular to a local flow direction of the fluid configured for coked flow within the passage, and wherein an outlet axis of the passage intersects an adjacent component so as to direct the fluid on to the adjacent component.

A further embodiment of any of the foregoing systems, wherein the coupling can further include a plurality of rolling elements disposed between the rotating component and the non-rotating component, wherein the non-rotating component can further define a second passage therein that is configured to direct fluid from the cavity to the plurality of rolling elements.

A further embodiment of any of the foregoing systems, wherein a surface of the housing can be spaced from an opposing surface of the non-rotating component to define an annular gap in fluid communication with the cavity, and wherein the cavity can contain a fluid having a pressure sufficient to radially restrain the coupling with respect to the housing.

A further embodiment of any of the foregoing systems, wherein the first and second passages can have cross-sectional areas defined perpendicular to a local flow direction of the fluid configured for choked flow within the first and second passages.

A method of utilizing a pressurized fluid includes providing a coupling having a rotating component and a non-rotating component, providing a housing affixed with respect to the non-rotating component having a cavity define therebetween, supplying a pressurized fluid to the cavity, providing a first passage extending from the cavity to a first axially-facing surface of the non-rotating component, and directing the pressurized fluid through the first passage. The first passage can have a cross-sectional area perpendicular to a local flow direction of the pressurized fluid configured for choked flow condition within the first passage.

The method of the preceding paragraph can optionally include, additionally and/or alternatively, any one or more of the following features, configurations and/or additional components:

A further embodiment of the foregoing method can further include providing a plurality of rolling elements between the rotating component and the non-rotating component, wherein the first passage can be configured to direct fluid on to at least one of the plurality of rolling elements.

A further embodiment of any of the foregoing methods can further include providing at least one seal disposed between the housing and the non-rotating component, wherein the seal can be configured to retain the pressurized fluid within the cavity, and wherein a surface of the housing can be spaced from an opposing surface of the non-rotating component to define an annular gap in fluid communication with the cavity, and wherein the pressurized fluid can have a pressure sufficient to radially restrain the coupling with respect to the housing.

A further embodiment of any of the foregoing methods can further include providing a second passage extending from the cavity to a second axially-facing surface of the non-rotating component and directing the pressurized fluid through the second passage such that a jet of fluid impinges on an adjacent component, wherein the second passage can have a cross-sectional area perpendicular to a local flow direction configured for choked flow within the second passage.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system for utilizing a pressurized fluid comprises:
 a first body member;
 a second body member having walls that define a cavity between the first and second body members, a first portion of a first passage within the second body member, and a second passage extending from the cavity to a plenum;
 a protrusion extending axially from the second body member having walls that define a second portion of the first passage;
 a third body member moveable relative to the second body member, wherein the first, second, and third body members are coaxially disposed; and
 a plurality of rolling elements disposed between and contacting the second and third body elements such that the third element is rotatable with respect to the second body element, wherein the first passage is configured to direct pressurized fluid from the cavity, through the protrusion, and onto at least one of the plurality of rolling elements, and wherein the second passage is configured to direct the pressurized fluid from the cavity onto an adjacent component within the plenum.

2. The system of claim 1, wherein a surface of the first body member is spaced from an opposing surface of the second body member so as to define an annular gap in fluid communication with the cavity.

3. The system of claim 2 and further comprising:
 at least one seal disposed between the first and second body members and configured to retain the pressurized fluid within the cavity.

4. The system of claim 1, wherein the first passage has a cross-sectional area defined perpendicular to a local flow direction of the pressurized fluid configured for choked flow within the passage.

5. The system of claim 1, wherein a surface of the first body member is spaced from an opposing surface of the second body member so as to define an annular gap cooperating with the cavity, and wherein the second passage is one of a plurality of second passages angularly spaced within the second body member about an axis, wherein each second passage extends from the cavity to the plenum, and wherein each second passage has a cross-sectional area perpendicular to a local flow direction, the cross-sectional areas configured for choked flow within each second passage.

6. The system of claim 1, wherein the second passage is configured to discharge a jet of fluid that impinges on the adjacent component.

7. The system of claim 1, wherein the first passage is configured to discharge a jet of fluid that impinges on the third body member and the plurality of rolling elements.

8. A system comprising:
a coupling comprising:
   a rotating component;
   a non-rotating component coaxially disposed with respect to the rotating component having a first passage and a second passage defined therein;
   a protrusion extending from the non-rotating component; and
   a plurality of rolling elements disposed between and contacting the rotating component and the non-rotating component; and
a housing affixed with respect to the non-rotating component, wherein the housing and the non-rotating component have walls that define a cavity therebetween;
wherein the first passage extends from the cavity to an axially-facing surface of the non-rotating component, and wherein the first passage has a cross-sectional area defined perpendicular to a local flow direction of the fluid configured for choked flow within the first passage, and wherein the first passage directs the pressurized fluid from the cavity onto an adjacent component, and
wherein the second passage extends from the cavity, through the non-rotating component and the protrusion to direct fluid from the cavity onto the plurality of rolling elements, and wherein the second passage has a cross-sectional area defined perpendicular to a local flow direction of the fluid, the cross-sectional area being configured for choked flow within the second passage.

9. The system of claim 8, wherein a surface of the housing is spaced from an opposing surface of the non-rotating component to define an annular gap in fluid communication with the cavity, and wherein the cavity and the annular gap contain a fluid having a pressure sufficient to radially restrain the coupling with respect to the housing.

10. A method of utilizing a pressurized fluid comprising:
providing a coupling having a rotating component and a non-rotating component, wherein the rotating component and the non-rotating component are coaxially disposed;
providing a plurality of rolling elements between and contacting the rotating component and the non-rotating component;
providing a housing affixed with respect to the non-rotating component, wherein the housing and the non-rotating component define a cavity therebetween;
supplying a pressurized fluid to the cavity;
providing a first passage extending from the cavity, through the non-rotating component, and to an axially-facing surface of the non-rotating component, wherein the first passage has a first cross-sectional area perpendicular to a local flow direction of the pressurized fluid, the first cross-sectional area being configured for choked flow within the first passage; and
directing the pressurized fluid through the first passage onto an adjacent component;
providing a second passage extending from the cavity to the rotating component, wherein the second passage has a second cross-sectional area perpendicular to a local flow direction, the second cross-sectional area begin configured for choked flow within the second passage; and
directing the pressurized fluid through the second passage such that a jet of fluid impinges on the plurality of rolling elements.

11. The method of claim 10 and further comprising:
providing at least one seal disposed between the housing and the non-rotating component, wherein the seal is configured to retain the pressurized fluid within the cavity;
wherein a surface of the housing is spaced from an opposing surface of the non-rotating component to define an annular gap in fluid communication with the cavity, and wherein the pressurized fluid has a pressure sufficient to radially restrain the coupling with respect to the housing.

* * * * *